US00RE47603E

(19) United States
(12) Reissued Patent
Shaw

(10) Patent Number: US RE47,603 E
(45) Date of Reissued Patent: Sep. 17, 2019

(54) TROPHY MOUNT

(71) Applicant: Robert Jensen Shaw, Klamath Falls, OR (US)

(72) Inventor: Robert Jensen Shaw, Klamath Falls, OR (US)

(73) Assignee: Ivent LLC, Klamath Falls, OR (US)

(21) Appl. No.: 14/736,171

(22) Filed: Jun. 10, 2015

Related U.S. Patent Documents

Reissue of:
(64) Patent No.: 8,459,601
Issued: Jun. 11, 2013
Appl. No.: 12/806,132
Filed: Aug. 7, 2010

U.S. Applications:
(60) Provisional application No. 61/273,657, filed on Aug. 7, 2009.

(51) Int. Cl.

| | |
|---|---|
| ***A47B 96/06*** | (2006.01) |
| ***A47G 29/00*** | (2006.01) |
| ***A47F 5/00*** | (2006.01) |
| ***A47B 91/00*** | (2006.01) |
| ***A47G 35/00*** | (2006.01) |
| ***A47F 5/08*** | (2006.01) |
| ***B44C 5/02*** | (2006.01) |

(52) U.S. Cl.
CPC ..... *A47F 5/0823* (2013.01); *B44C 5/02* (2013.01); *A47F 5/0815* (2013.01)

(58) Field of Classification Search
CPC ..... A47F 5/0823; A47F 5/0815
USPC ..... 248/220.41, 223.31, 289.11
See application file for complete search history.

(56) References Cited

U.S. PATENT DOCUMENTS

| | | | | | |
|---|---|---|---|---|---|
| D14,310 | S | * | 9/1883 | Palmenberg | D6/323 |
| 318,147 | A | * | 5/1885 | Stevens | 211/96 |
| 3,640,497 | A | * | 2/1972 | Waki | 248/220.41 |
| 3,897,926 | A | * | 8/1975 | Silver | 248/220.22 |
| 4,225,106 | A | * | 9/1980 | Eplan | 248/309.1 |
| 4,257,410 | A | * | 3/1981 | Flewelling | 602/33 |
| 4,464,440 | A | * | 8/1984 | Dotzman | 428/542.4 |
| 4,615,077 | A | * | 10/1986 | Beebe | 452/187 |
| 5,054,628 | A | * | 10/1991 | Allen | 211/104 |
| 5,078,276 | A | * | 1/1992 | Rogge et al. | 211/18 |
| D332,299 | S | * | 1/1993 | Dryna et al. | D22/147 |

(Continued)

*Primary Examiner* — Beverly M Flanagan
(74) *Attorney, Agent, or Firm* — Schwabe, Williamson & Wyatt, P.C.

(57) ABSTRACT

A trophy mount for displaying the skull and horn or antler of game animals comprising; a base with one or more holes in the base for attaching the base to a vertical surface, a wing that attaches to the base by means of an upper and lower hinge socket on the base that are able to receive an upper and lower wing joint from the wing with the sockets and joints sized to allow the wing to pivot with respect to the base which is secured to the vertical surface, a bracket that has one or more adjustment holes and a pivot hole, means for securing the bracket to the wing such that the bracket can be positioned at various angles with respect to the base, a center prong on the bracket that is sized to fit within a Foramen magnum of a vertebrate game animal, and a right and left side arm that are spaced, sized and positioned below and slightly in front of the center prong such that the right and left side arms fit into the condyloid fossa of a game animal's skull.

13 Claims, 9 Drawing Sheets

(56) References Cited

U.S. PATENT DOCUMENTS

| | | | | |
|---|---|---|---|---|
| 6,170,185 | B1 * | 1/2001 | Donofrio, Jr. | 40/800 |
| 6,439,533 | B2 * | 8/2002 | Armstrong | 248/447.1 |
| D462,844 | S * | 9/2002 | Chou | D6/323 |
| D465,661 | S * | 11/2002 | Hoernig | D6/323 |
| 6,481,677 | B1 * | 11/2002 | Yu | A47F 5/083 211/59.1 |
| 6,698,124 | B2 * | 3/2004 | Kump et al. | 40/642.02 |
| 6,828,035 | B1 * | 12/2004 | Goettl | 428/542.4 |
| D570,613 | S * | 6/2008 | Ricereto | D6/323 |
| 7,427,053 | B2 * | 9/2008 | Nawrocki | A47F 5/0006 211/57.1 |
| 7,992,833 | B1 * | 8/2011 | Goodman | A47G 25/0614 248/298.1 |
| 2011/0036959 | A1 | 2/2011 | Raby | |

* cited by examiner

NEW

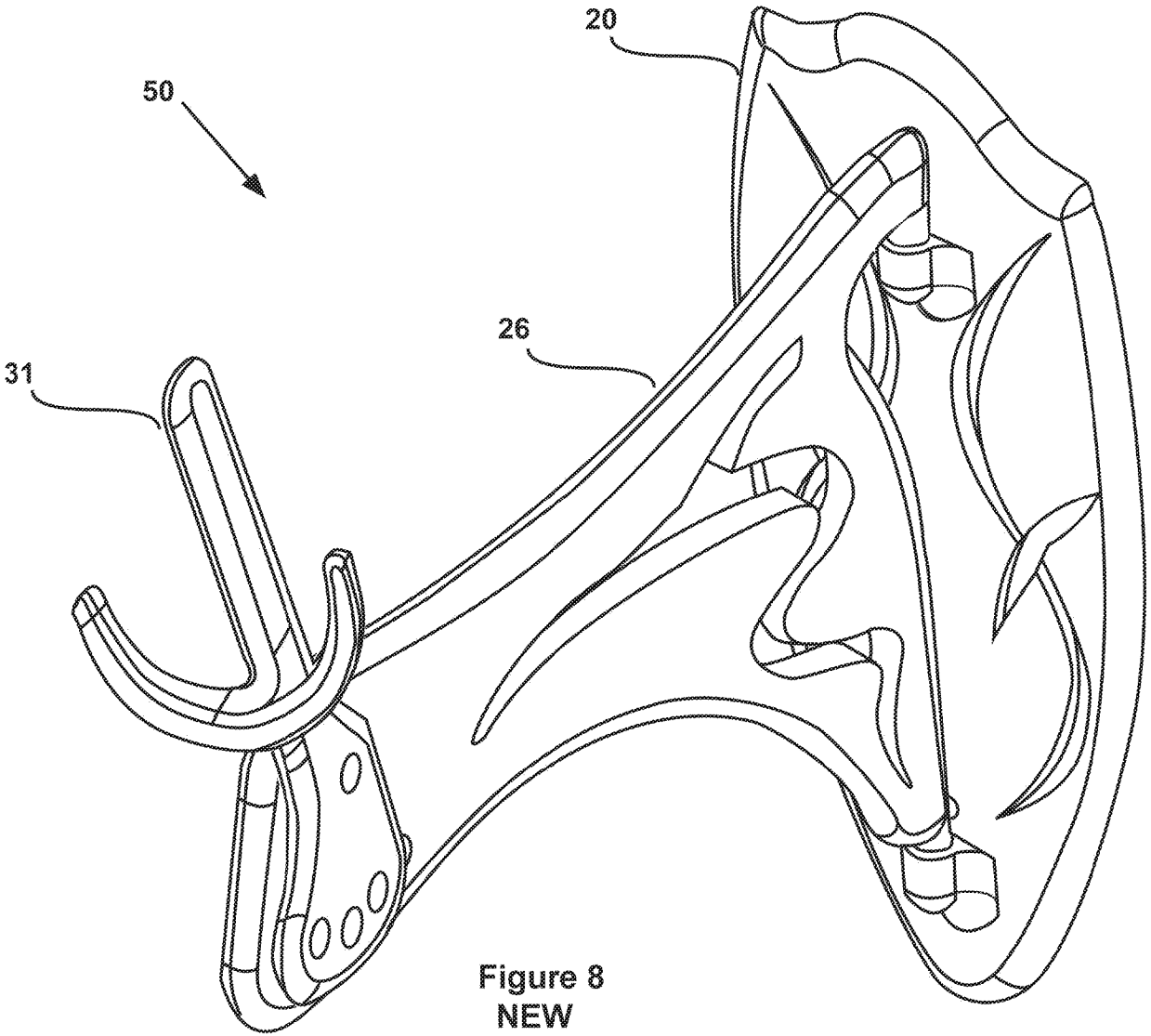
Figure 8
NEW

TROPHY MOUNT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION a. Provisional Patent Application 61/273,657 filed Aug. 7, 2009

BACKGROUND OF THE INVENTION

*More than one reissue application has been filed for the reissue of Pat. No. 8,459,601. The reissue applications are 15/919,403, filed on Mar. 13, 2018, and 14/736,171, filed on Jun. 10, 2015, both of which are divisional reissues of Pat. No. 8,459,601.*

The present invention relates to an apparatus for the mounting and displaying of a European mount. Typically European mounts consist of a display using a game animal's skull with any associated horns or antlers. Many of the current designs for European mounts are replete with systems that require physically attaching the skull to a mounting apparatus by means such as, screws, glue, staples, nails and the like. The present invention is to be used on European type mounts which are done primarily by hunters of deer, elk, antelope, bear, cougar and many other mammals.

One of the benefits of using or displaying European mounts is the ease to maintain and keep the mount as there is little or no animal flesh, hide or internal parts to maintain; the skull, horn and antler are the only parts displayed. European mounts are rapidly becoming a preferred means for displaying one's game trophy. There are several drawbacks with the current devices used to display European mounts. The present invention is intended to overcome several of the shortcomings associated with the current devices on the market.

There are several styles for displaying a European mount. The most common form of displaying a European mount is to fix the base or anterior portion of the animal's skull to a board or plaque with the associated horns or antler placed on the animal by screws or glue. The skull is usually affixed to the board or plaque with screws, glue, staples or some other attachment device to secure the skull to the board or plaque. The skull usually sits in a parallel plane to the surface of the board or plaque. Some of these types of devices have means for adjusting the angle of the board or plaque. For example, many of the boards or plaques come with means to secure the board or plaque against a wall so the board or plaque is fixed perpendicular to the floor and usually high or higher on the wall on which it is secured.

While the horns or antlers of European mounts can be left upon the animal, a mount in which the base of the skull sits flat or parallel to the vertical surface upon which it is mounted leaves the horns or antlers sticking out from the vertical surface upon which the animal is mounted. This not only looks unattractive it provides a poor profile of the horns or antler. To remedy this, some European mounts detach the horns or antlers from the skull and affix the horns or antlers to the skull in manner in which the horns or skulls are positioned up or in manner as if the skull was parallel to the floor. This is quite difficult and requires the additional steps of removing and mounting the skulls to the skull in an unnatural position. The means for securing the horns and antlers to the skull are many and known to those skilled in the art or European mounts and taxidermy.

European mounts affixed to boards or plaques can cost quite a bit of money especially if the mounting requires securing the skull to the board or plaque, the type of wood or carving done on the board or plaque surface, and how the horns or antlers are secured to the skull. Another drawback for this type of system is the relative inflexibility for displaying the skull and associated horns or antlers. The view of the mount is relatively two dimensional and the full scope of the game's size and majesty are lost on the plane surface. Another drawback to this type of display is the limited views for displaying the animal at different angles in the room in which the animal is mounted. The animal is fixed and flat.

Some improvements to this type of European mounting system have been made, including; an angled board or plaque on which the animal sits. This allows for a mount on which the animal is affixed to have a more three dimensional quality to enhance the visual display of the animal in the room. Most of these systems are still have limitation that the present invention overcomes such as displaying the animal at one angle and one direction from the wall on which the animal is mounted. As European mounts become more popular, innovation on these types of displays has increased. Other innovations include means for adjusting the direction the animal can be mounted in the room. The one consistent limitation found in the prior art is the need secure the skull to the mount requiring some damage to the skull or drilling a hole into the skull for securing the skull to the mount.

Securing the skull to board or plaque mounted systems requires additional steps and there is most often times damage caused to the skull in securing the skull to the board or plaque. Typically, a screw or fastener is placed through the board or plaque and then through the skull of the animal. This usually requires drilling either a hole through the board or plaque and through the bones of the skull—or both. Some means for securing the skull are more reliable than others and it is not uncommon for skulls to become damaged if the bones are drilled into—thus causing the skull and mount to become worthless or of less value.

Other types of devices are available for European mounts including a device that allows for the skull to sit upon a bracket instead of a board or plaque. This type of mounting system is relatively inexpensive to make however like the board or plaque mounted devices, the bracket devices on the market are sometimes difficult to use and sometimes require screws or holes to be placed into the bones of the skull in order to secure the skull to the bracket. In the prior art, a bracket or a bracket that is affixed to a board or plaque can be secured directly to a vertical surface, like a wall. The bracket is usually set and placed at a fixed angle and orientation from the vertical surface and the skull is fixed to either one or more bracket arms. The bracket arms are usually secured to the skull by means of drilling one or more holes into the bones of the skull and then securing the skull to the bracket arms by means of securing devices, such as screws or clips.

Again this type of mounting device has the same limitation as the board or plaque type of display, including; displaying a mount on a fixed orientation and angle; and drilling or damaging the bones of the skull to secure the skull to the bracket. There is a need for a device that can be used for displaying a European mount that allows the animal to be displayed at various angles and directions and a display that can securely attach the skull to the mount without damaging or drilling the bones of the animals skull.

BRIEF SUMMARY OF THE INVENTION

A trophy mount for displaying the skull and horn or antler of game animals comprising; a base with one or more holes in the base for attaching the base to a vertical surface, a wing that attaches to the base by means of an upper and lower hinge socket on the base that are able to receive an upper and lower wing joint from the wing with the sockets and joints sized to allow the wing to pivot with respect to the base which is secured to the vertical surface, a bracket that has one or more adjustment holes and a pivot hole, means for securing the bracket to the wing such that the bracket can be positioned at various angles with respect to the base, a center prong on the bracket that is sized to fit within a Foramen magnum of a vertebrate game animal, and a right and left side arm that are spaced, sized and positioned below and slightly in front of the center prong such that the right and left side arms fit into the condyloid fossa of a game animal's skull.

The present invention includes means for adjusting the center prong and right and left side arms of the bracket.

BRIEF DESCRIPTION OF THE DRAWINGS

*FIG. 8 is a perspective view of an assembly of the base, wing, and small bracket.*

DETAILED DESCRIPTION OF THE INVENTION

Figure 1:
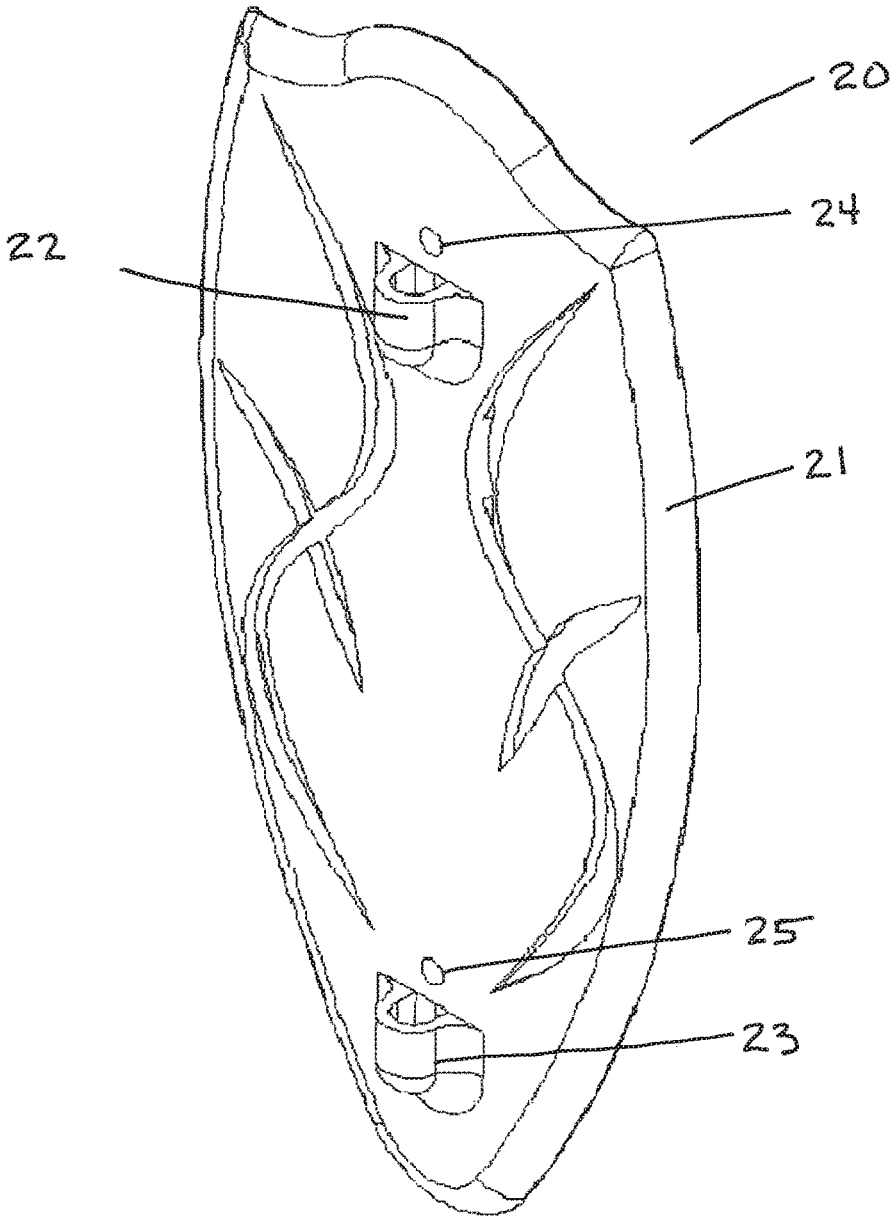
FIG. 1 is a perspective view of a base that attaches to a vertical surface for attaching the trophy mount.
Figure 3:
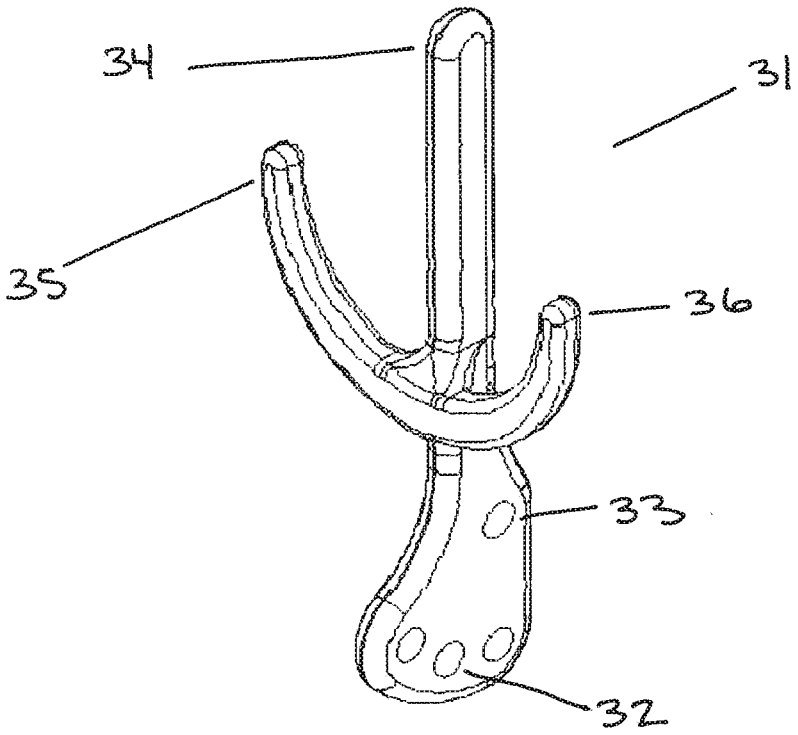
FIG. 3 is a perspective view of a small bracket showing adjustment holes, pivot hole, center prong and right and left side arms.
Figure 4:
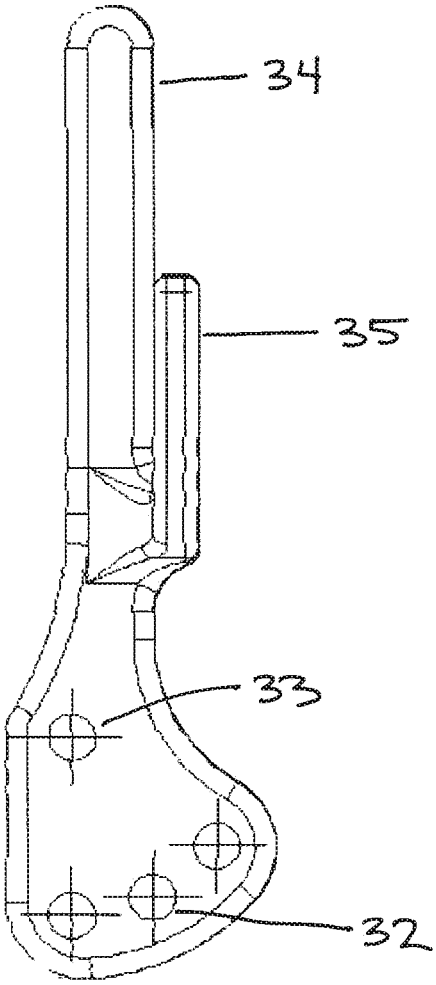
FIG. 4 is side view of the small bracket.
Figure 5:
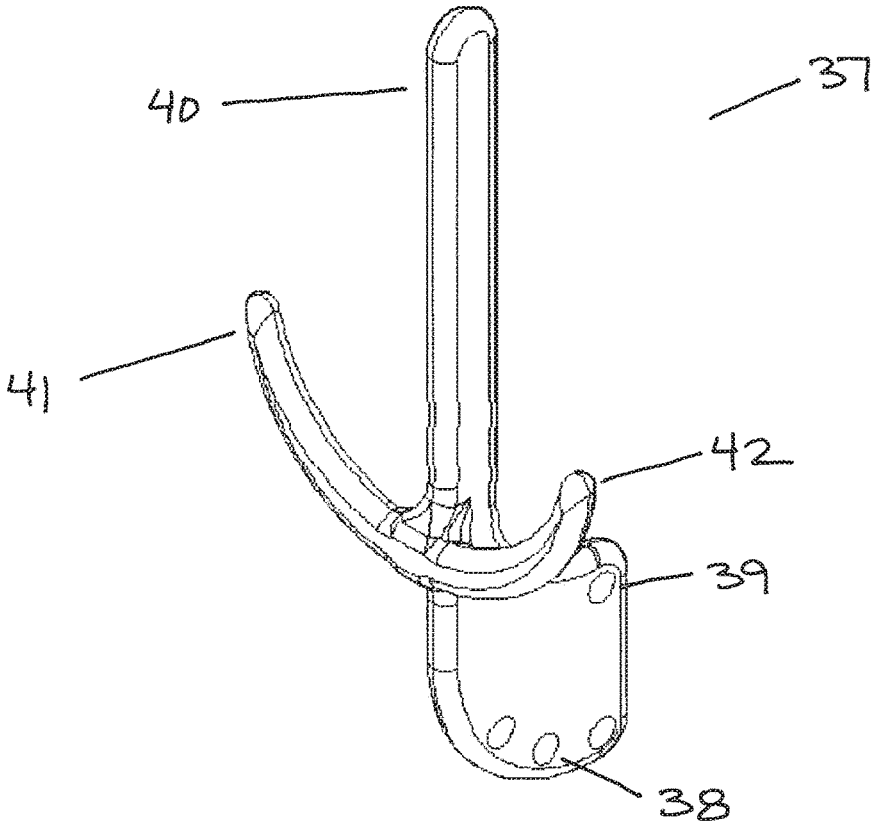
FIG. 5 is a perspective view of a large bracket showing adjustment holes, pivot hole, center prong and right and left side arms.
Figure 6:
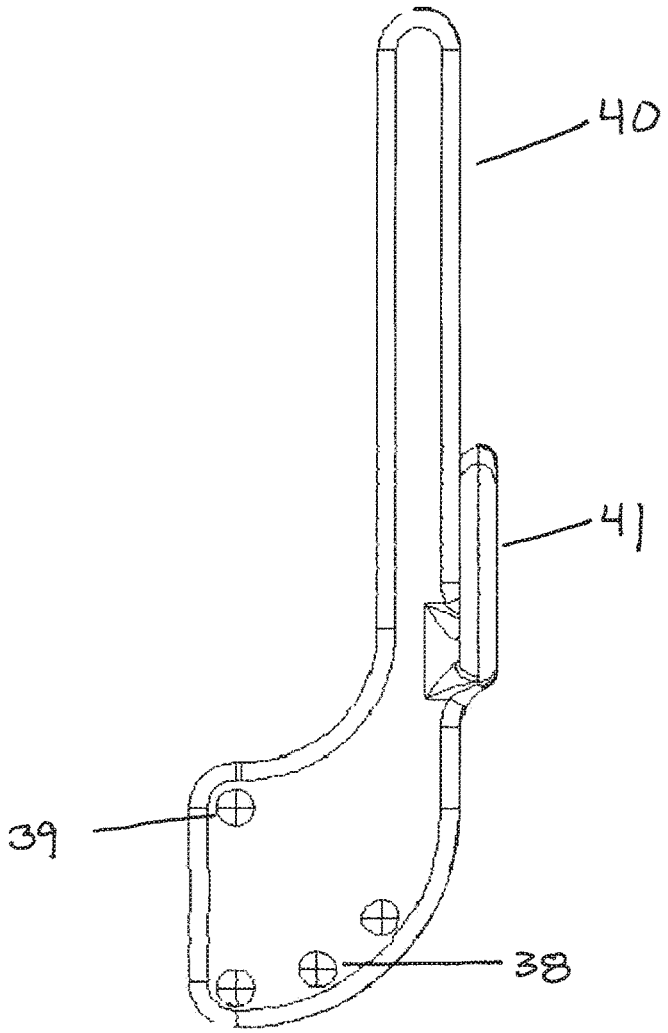
FIG. 6 is *a* side view of the large bracket.

Referring now to the drawings a trophy mount for displaying European mounts is described. FIG. 1 depicts a base upon which the European mount will be attached to a vertical surface with hinge points on the base for pivoting the mount to a desired angle in the space the mount is to be displayed. The base 20 is made of a base board 21 that has an upper hinge socket 22 and a lower hinge socket 23. The base is secured to a vertical surface, typically a wall, by placing screws through the upper and lower screw holes, 24 and 25 respectively. The base is the means by which the European mount is secured to the wall and either a small bracket 31 or a large bracket 37 as shown in FIGS. 3 and 5.

Figure 2:
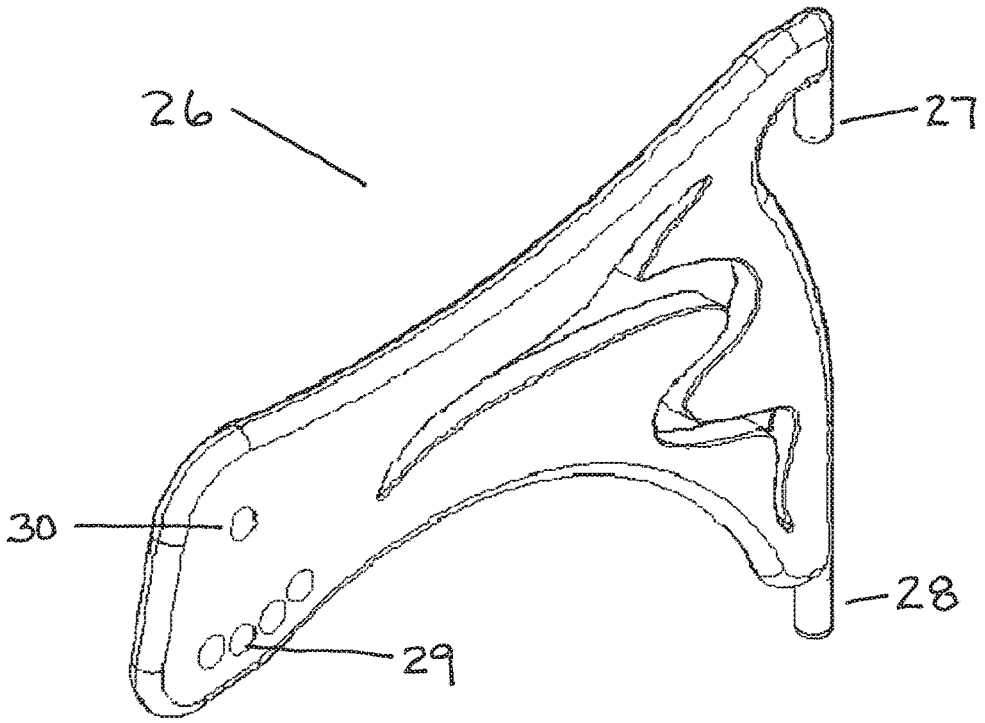
FIG. 2 is a perspective view of a wing that connects to the base to a bracket. The wing is able to pivot on the base by means of an upper and lower wing joint.
Figure 2A:
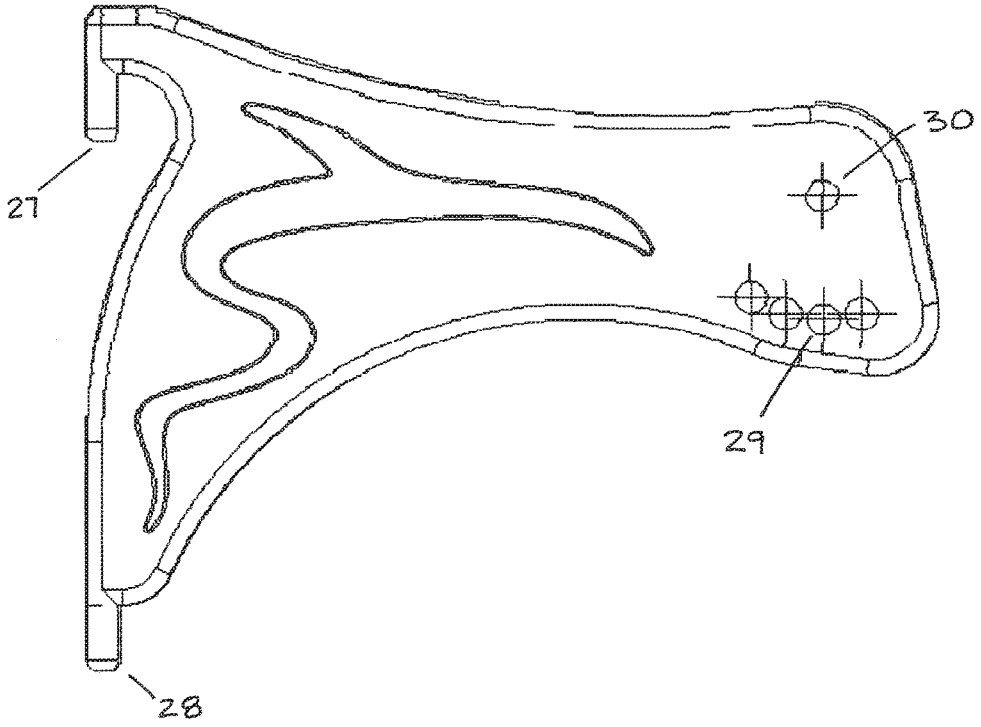
FIG. 2a is a side view of the wing.

FIG. 2 depicts a wing 26 that connects the base 20 to the bracket 31 or 37. The wing has an upper wing joint 27 and a lower wing joint 28 that sit in the upper and lower hinge sockets 22 and 23 respectively of the base. The joints and sockets are sized such that the wing is able to pivot left and right across the face of the base. This allows for the positioning of the European mount at various angles in the space in which the mount is displayed. A locking device, not pictured, can be placed on the base or the wing such that once the mount has been positioned with respect to the vertical surface the wing is locked into place.

Also on the wing 26 are several adjustment holes 29 and a pivot hole 30. The adjustment holes are sized and placed on the wing for adjusting the angle of the mount with respect to the floor in which the mount is displayed. In one embodiment of the invention, the holes are threaded. A fastening device, such as *a* threaded screw is placed through an adjustment hole on the bracket and an adjustment hole on the wing. Since there are several adjustment holes at various angles on the wing and bracket, a user is able to adjust the angle at which the European mount is displayed. *Thus, the bracket is adjustably mounted to the wing to vertically adjust the angle of the bracket with respect to the wing.*

The pivot hole is placed above the adjustment holes and is used to secure the mount once the proper angle for the mount is found. In one embodiment of the invention, the pivot hole in the wing and bracket are threaded and a set screw is used for setting the proper angle of the bracket with respect to the floor and wall.

A bracket is used to support the skull and thus any horn or antlers upon the skull. The present invention can use various sizes of brackets depending on the size of the animal to be displayed. The inventor has found that two sizes, a small and large bracket, provide a wide coverage for the various animal skulls that are typically displayed. In FIG. 3, a small bracket 31 is shown with adjustment holes 32 and a pivot hole 33. As discussed above, the adjustment hole and pivot hole in the bracket and wing are aligned and a means for securing the bracket to the wing is used to once the user has adjusted the angle the mount is to be displayed.

*FIG. 8 is a perspective view of an assembly 50 of the base 20, wing 26, and small bracket 31.*

The bracket also has a center prong 34 that projects upward from the bracket. The center prong is part of the three arm system for securing the skull to the bracket and thus the wall through the wing. The center prong 34 is sized such that the skull is able to sit on the bracket by placing the center prong through a nature hole in the skull known as the Foramen magnum. The skull is comprised of several bones that fuse together to form a protective shell for the brain. The Foramen magnum is a natural hole that runs through the occipital bone of the skull. The Foramen magnum is the animal's the natural conduit for the nerves and arteries from the brain to the rest of the animal's body. Typically in vertebrate animals, the skull sits upon the top vertebrate and the brain is connected to various parts of the body by nerves that run from the brain impulses through the body by means of the vertebrate that run down the animal's body. The skull is configured such that the Foramen magnum is lined up axially in the center of the skull and positioned at the anterior of the skull or the bottom of the skull when the animal is upright.

Another natural feature of skulls belonging to vertebrate animals is two natural crevices that sit on the left and right side of the Foramen magnum. These natural crevices are formed around a bony ridge called the occipital condyles. The natural crevices are part of the articulation between the upper vertebrate and the skull. The upper vertebrate has lateral masses that pivot in the natural crevices of the skull when the animal is lifting and rotating its head.

The small bracket has a right side arm 35 and a left side arm 36 that are spaced apart and set lower than the center prong and this placement of the arms allows the arms to sit within the natural crevice formed by the occipital condyles. This natural depression, the condyloid fossa, receives the posterior margin of the superior facet of the upper vertebrate when the head or skull is bent backward. Thus the right and left side arms are set below the center prong and when the skull's Foramen magnum is placed over the center prong the skull is lowered such that the right and left side arms rest in theses natural depressions.

When the skull is placed over the center prong, the center prong enters the skull cavity and the interior of the supraoccipital rests upon the top of the center prong. The right and left side arms secure the skull from moving or swaying once the skull is placed upon the bracket. The skull can be placed on the bracket and secured without the need to use the typical means for securing a skull to a mounting device such as screws, glue, staples or other means that can damage the skull or lesson the value of the trophy.

One embodiment of the present invention which is not depicted includes a means to adjust the space between the right and left side arms of the bracket. By having a means to adjust the space between the right and left side arms, the size and shape of the animal's skull can be fitted more securely onto the bracket. Another embodiment not shown is an adjustable center prong that can be extended or retracted depending on the size of the animal. Thus the center prong and right and left side arms of the bracket can securely attach the skull to the wing and base without the need to damage or drill into the skull.

Figure 7:
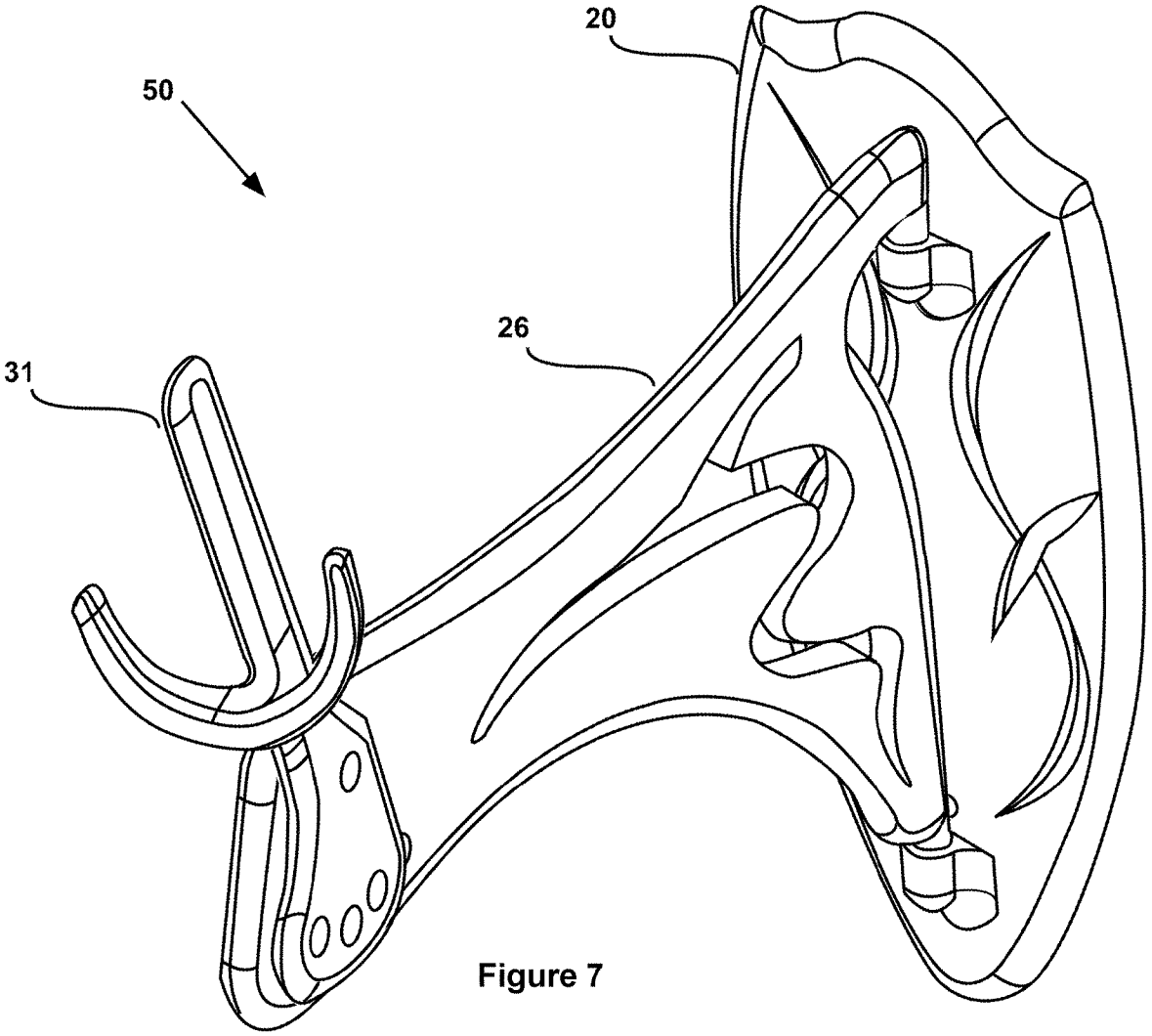
*FIG. 7 is a perspective view of an assembly of the base, wing, and small bracket.*

*FIG. 7 is a perspective view of an assembly 50 of the base 20, wing 26, and small bracket 31.*

I claim:

1. A trophy mount, comprising:

a base;

a wing pivotally mounted to the base; and a bracket to receive and display a wildlife skull, the bracket being adjustably mounted to the wing *to vertically adjust the angle of the bracket with respect to the wing*, the bracket including a first prong extending upward a first distance, a second prong adjacent the first prong and extending upward a second distance that is less than the first distance, and a third prong extending a third distance that is less than the first distance, wherein the first prong is *a single solid element extending linearly from the wing and* shaped to complement a first portion of the wildlife skull, the second prong is shaped to complement a second portion of the wildlife skull, the third prong is shaped to complement a third portion of the wildlife skull, and wherein the second and third prongs *are laterally spaced apart from and flanking opposite sides of the first prong and* are aligned along a plane that is offset from and parallel to a longitudinal axis of the first prong.

2. The trophy mount of claim 1, wherein the first prong is shaped to fit into the first portion of the wildlife skull.

3. The trophy mount of claim 1, wherein the second prong is shaped to fit into the second portion of the wildlife skull.

4. The trophy mount of claim [2] *3*, wherein the first and second prongs are separated from each other by a space so that when inserted into the first and second portions of the wildlife skull, respectively, the first and second prongs securely retain the wildlife skull.

5. The trophy mount of claim 4, further comprising means to adjust the space between the first and second prongs.

6. The trophy mount of claim 1, wherein the first portion of the wildlife skull is a Foramen magnum, the second portion of the wildlife skull is a condyloid fossa, and the first and second prongs are spaced apart so that they simultaneously fit into the Foramen magnum and the condyloid fossa, respectively.

7. The trophy mount of claim 1, wherein the second and third prongs flank the first prong.

8. The trophy mount of claim 7, wherein the third prong is shaped to fit into another condyloid fossa of the wildlife skull.

9. The trophy mount of claim 1, wherein the wing includes a plurality of spaced apart holes, so that the bracket is selectively adjustable among a plurality of positions.

10. The trophy mount of claim 9, further comprising a pivot hole equally spaced from each of the plurality of spaced apart holes.

11. The trophy mount of claim 1, further comprising means to adjust the first distance of the first prong.

12. The trophy mount of claim 1, further comprising a locking device for locking the wing into place with respect to the base.

[13. A bracket for receiving and displaying a wildlife skull, comprising:

a first center prong having a first end and a second end, the first end configured to couple to a corresponding wing of a trophy mount, the second end extending upward a first distance in a first direction and being shaped to fit into a Foramen magnum of a wildlife skull;

a second prong adjacent the first center prong and having a first end and a second end, the first end coupled to the first center prong, the second end extending upward in a direction substantially parallel to the first direction and extending a second distance that is less than the first distance, the second prong being spaced from the first center prong to fit into a condyloid fossa of the wildlife skull while the first center prong is inserted into the Foramen magnum;

a third prong adjacent the first center prong, opposite the second prong, and having a first end and a second end, the first end coupled to the first center prong, the second end extending upward in a direction substantially parallel to the first direction and extending a third distance that is less than the first distance, the third prong being spaced from the first center prong to fit into another condyloid fossa of the wildlife skull while the first center prong is inserted into the Foramen magnum; and a first plurality of spaced apart holes, each equally spaced from a first pivot hole, wherein the first plurality of spaced apart holes and the first pivot hole match a second plurality of holes and a second pivot hole, respectively, of a corresponding wing.]

[14. The bracket of claim 13, wherein the first and second prongs and the first and third prongs are separated from each other by space so that when inserted into the Foramen magnum and condyloid fossa of the wildlife skull, respectively, the first and second prongs securely retain the wildlife skull.]

[15. The bracket of claim 14, further comprising means to adjust the space between the first and second prongs and/or the first and third prongs.]

[16. The bracket of claim 13, further comprising means to adjust a length of the first prong.]

[17. The bracket of claim 13, wherein the second and third distances are substantially the same.]

[18. The bracket of claim 13, wherein the second and third prongs are individual extensions of an integral, unitary element.]

[19. The bracket of claim 13, wherein the first, second and third prongs comprise an integral, unitary element.]

20. A trophy mount, comprising:

a base;

a bracket to receive and display a wildlife skull, the bracket coupled to the base, the bracket including a first center prong having a first end and a second end, the first end configured as a mount or to couple to a corresponding portion of a mount, the second end *being a single solid element* extending upward a first distance in a first direction *linearly from the first end* and being shaped to fit into a Foramen magnum of a wildlife skull;

a second prong adjacent the first center prong and having a first end and a second end, the first end coupled to the first center prong, the second end extending upward in a direction substantially parallel to the first direction and extending a second distance that is less than the first distance, the second prong being spaced from the first center prong to fit into a condyloid fossa of the wildlife skull while the first center prong is inserted into the Foramen magnum;

a third prong adjacent the first center prong, opposite the second prong, and having a first end and a second end, the first end coupled to the first center prong, the second end extending upward in a direction substantially parallel to the first direction and extending a third distance that is less than the first distance, the third prong being spaced from the first center prong to fit into another condyloid fossa of the wildlife skull while the first center prong is inserted into the Foramen magnum, *and wherein the second and third prongs are laterally spaced apart from and flanking opposite sides of the first center prong and are aligned along a plane that is offset from and parallel to a longitudinal axis of the first center prong*; and a wing pivotally mounted to the base to couple the bracket to the base, *the bracket being adjustably mounted to the wing to vertically adjust the angle of the bracket with respect to the wing*.

[21. The trophy mount of claim 20, wherein the bracket is adjustably mounted to the wing.]

* * * * *